United States Patent
Hepner et al.

(10) Patent No.: US 6,216,437 B1
(45) Date of Patent: Apr. 17, 2001

(54) METHOD FOR REGULATING THE POWER OF A TURBO SET

(75) Inventors: Stephan Hepner, Althäusern; Hans-Kaspar Scherrer, Würenlos, both of (CH)

(73) Assignee: Asea Brown Boveri AG, Baden (CH)

( * ) Notice: Subject to any disclaimer, the term of this patent is extended or adjusted under 35 U.S.C. 154(b) by 0 days.

(21) Appl. No.: 09/153,020

(22) Filed: Sep. 15, 1998

(30) Foreign Application Priority Data

Sep. 22, 1997 (EP) .................................... 97810694

(51) Int. Cl.[7] .................................... F02C 9/00
(52) U.S. Cl. ......................... 60/39.03; 60/39.27
(58) Field of Search ................ 60/39.03, 39.27, 60/39.281, 39.282

(56) References Cited

U.S. PATENT DOCUMENTS

| 3,898,842 | 8/1975 | Luongo . |
| 4,242,592 | 12/1980 | Yannone et al. . |
| 4,522,026 | * 6/1985 | Peterson et al. ................ 60/39.281 |
| 4,625,510 | * 12/1986 | Evans ................................ 60/39.282 |
| 4,639,854 | 1/1987 | Kurokawa et al. . |
| 5,896,736 | * 4/1999 | Rajamani ........................... 60/39.03 |

FOREIGN PATENT DOCUMENTS

| 3422210A1 | 12/1984 | (DE) . |
| 19516799A1 | 11/1996 | (DE) . |
| 244011 | 12/1970 | (PL) . |
| 85-255276 | 4/1985 | (SU) . |
| WO93/15311 | 8/1993 | (WO) . |

OTHER PUBLICATIONS

"Dynamic Simulation of Hybrid Wind–Diesel Power Generation System with Superconducting Magnetic Energy Storage", S.C. Tripathy, Energy Convers. Mgmt. vol. 38, No. 9, pp.919–930 (1997).

* cited by examiner

Primary Examiner—Louis J. Casaregola
(74) Attorney, Agent, or Firm—Burns, Doane, Swecker & Mathis, L.L.P.

(57) ABSTRACT

In a method for regulating the power of a turbo set (10) converting thermal power into electric power, said turbo set (10) comprising, on a common shaft (17), a turbine (11) driven by the thermal power and a generator (16) driven by the turbine (11) and delivering electric power ($P_G$) to a network (18), the electric power ($P_G$) delivered by the generator (16) is determined and the thermal power ($P_T$) for the turbine (11) is regulated as a function of the measured electric power ($P_G$). Destabilization of the network and overloading of the turbo set (10) are avoided by additionally determining the kinetic power ($P_{kin}$) consumed or delivered by the shaft (17) and by regulating the thermal power ($P_T$) in accordance with the sum of the electric power ($P_G$) and kinetic power ($P_{kin}$).

9 Claims, 2 Drawing Sheets

METHOD FOR REGULATING THE POWER OF A TURBO SET

BACKGROUND OF THE INVENTION

1. Field of the Invention

The present invention relates to the field of power station technology. It refers to a method for regulating the power of a turbo set converting thermal power into electric power, said turbo set comprising, on a common shaft, a turbine driven by the thermal power and a generator driven by the turbine and delivering electric power to a network.

2. Discussion of Background

The conventional way of regulating the output power of a gas turbine is to measure the electric output power PG delivered at the output terminals of the associated generator, to compare the measured value with a predetermined power value (desired value) PC and to transmit the resulting differential signal ΔP=PG−PC as a control signal to a power regulator which regulates the thermal power of the gas turbine.

An illustrative circuit diagram for such known power regulation is reproduced in FIG. 1. The power of a turbo set 10 consisting of a gas turbine 15 and of a generator 16 is regulated. The gas turbine 15 comprises the actual turbine 11, a combustion chamber 12, a compressor 13 and a controllable inlet 14 for the combustion air, said inlet usually consisting of adjustable inlet guide vanes (Variable Inlet Guiding Vanes VIGVs). The turbine 11 and generator 16 are seated on a common shaft 17, the rotary frequency f of which is measured by means of a rotary frequency encoder 25. The generator 16 delivers the generated electric power PG to a network 18, as a rule a three phase network. The electric power PG of the generator 16 is compared, in a subtractor 19, with a predetermined power value PC and the difference ΔP is fed to a power regulator 20 which in turn, via the controllable inlet 14, controls the quantity of combustion air fed to the compressor 13 and the mass flow dmfc/dt of the fuel fed to the combustion chamber 12.

The predetermined power value (desired value) PC is obtained from the sum PCt=PC*+ΔPCt of a reference power value PC* and a correction value ΔPCt. The correction value ΔPCt, for its part, derives from a characteristic encoder 23 which, in the event of a deviation of the measured rotary frequency f from a rotary frequency desired value fc, outputs an appropriate correction value in accordance with the difference Δf formed in a subtractor 24 and with a predetermined characteristic ΔPC=K(Δf). A rate limiter 21 is additionally provided, which limits the rate of change of the regulating signal.

It has now emerged, that the regulating circuit illustrated in FIG. 1 may lead to a possibly hazardous behavior of the gas turbine when high (positive or negative) accelerations of the shaft occur. In this case, the measured (electric) output power PG of the turbo set is no longer a measure of the generated thermal power PT of the gas turbine 15, said thermal power being determined by the mass flows of the combustion air and fuel, but additionally contains an appreciable fraction of kinetic power. The resulting inequality between the measured output power and the generated thermal power may cause power regulation to initiate changes (unjustified per se) in the mass flows of combustion air and fuel which may be hazardous to the gas turbine itself and/or to the stability of the connected network.

Furthermore, if the generator switch opens, the measured electric power PG at the generator falls to zero, since there is no flow of power into the network. In this case, too, the result is inequality between the measured output power and the generated thermal power, and power regulation receives false information on the thermal state of the gas turbine, thus leading to an undesirable behavior of the power regulator.

The fundamental cause of the problems mentioned becomes clear when the following power equation for the rotor of the gas turbine is set up:

(1) $PG = PT - Pkin$,

PT signifying the effective thermal output power of the gas turbine, and (2) $Pkin = 4\pi^2 \theta f (df/dt)$ being the kinetic power of the shaft assembly, with the moment of inertia θ of the shaft assembly the, rotary frequency f of the shaft assembly and the rotary frequency change (acceleration) df/dt of the shaft assembly. The shaft assembly refers to the shaft as well as all rotating masses fixed to the shaft, for example rotor disks, blades, and so forth. It becomes clear from the equations (1) and (2) that the measurement of the electric output power PG is, in general, not directly a measure of the thermal power at the gas turbine, but a measure of the total power at the shaft, and includes the kinetic power which is delivered and consumed respectively in the event of braking and acceleration of the shaft.

This results in the following undesirable power regulation behavior patterns:

1. Thermal relief during a delivery of kinetic power

In this case, the rotor (shaft assembly) is sharply braked. This takes place, typically, when the gas turbine is synchronized with a network which undergoes a sharp fall in frequency. As a result of this fall, the rotor delivers a large amount of kinetic power, thus leading to a sudden rise in the measured output power PG. If the desired value PC does not change appreciably, power regulation reduces the thermal power PT, in order to keep the measured output power PG as near as possible to the desired value PC. However, this is precisely the wrong response of the regulating system, because a frequency fall in the network is a sign of an increased power requirement. Instead, gas turbines having sufficient power reserve should increase the thermal power, instead of reducing it, in order to assist in stabilizing the network. In addition, due to the delivery of kinetic power, the thermal relief of the gas turbine may lead to flame extinguishing which aggravates even further the already existing power deficit of the network. This behavior therefore, altogether, puts network stability at serious risk.

2. Thermal charging during load shedding

What is considered here, is the situation of a gas turbine which runs synchronously with a stable network at a constant speed and with a specific power (for example, 160 MW thermal power). Since the speed of the shaft is constant (df/dt=0; Pkin=0), the total measured electric power PG is, according to equation (1), identical to the thermal power PT. When the generator switch opens, then, the measured electric output power PG falls to zero. The power regulator consequently receives a signal representing an output power of 0 MW, even though the thermal power is actually unchanged (in the example, 160 MW). The power regulator is thereby falsely induced to increase the thermal power by an amount which is demanded by the power desired value. Theoretically, as a result, the thermal power may increase to double the power desired value PC. As soon as the generator switch opens, the rotor is accelerated by the thermal power PT. The fall of the signal PG and the resulting increased thermal power of the gas turbine will further increase the acceleration of the shaft, so that the shaft possibly reaches a speed limit range.

SUMMARY OF THE INVENTION

Accordingly the object of the invention is to provide a novel method for regulating the power of a turbo set, which method avoids the disadvantages described and regulates the thermal power in such a way that a network instability caused by the turbo set and overloading of the turbo set are reliably avoided.

In a method of the initially mentioned type, the object is achieved in that, in addition, the kinetic power consumed or delivered by the shaft is determined, and in that the thermal power is regulated in accordance with the sum of the electric power and kinetic power. Undesirable misbehavior of power regulation, particularly in the cases of load shedding and network instability, can be reliably avoided by incorporating the kinetic power of the shaft assembly in the regulation.

A first preferred embodiment of the method according to the invention is defined in that, in order to determine the kinetic power, the rotary frequency of the shaft is measured, and the kinetic power of the shaft assembly is calculated from the measured rotary frequency and its change in time, in accordance with the formula $Pkin=4\pi^2\theta f(df/dt)$ ($\theta$=moment of inertia of the shaft assembly). It is thereby possible in a simple way, by means of a single rotary frequency encoder on the shaft, to determine the kinetic power of the shaft assembly reliably and accurately at any moment.

In principle, the electric power can be measured at the terminals of the generator. According to a second preferred exemplary embodiment of the invention, another type of measurement, independent of the generator, is defined in that, in order to determine the electric power delivered by the generator, the rotary frequency of the shaft and the torque exerted on the shaft are measured and the electric power is calculated from these variables.

The moment of inertia $\theta$ of the shaft assembly is included in the determination of the kinetic power of the shaft. In principle, the moment of inertia may be calculated or else determined experimentally. A particularly simple method of determination is obtained if, according to a further preferred embodiment of the invention, in order to fix the moment of inertia $\theta$ of the shaft assembly, which is critical for regulation, the electric power is set to zero at one moment by isolating the generator from the network in a steady-state mode of the turbo set, and the rotary frequency and angular acceleration of the shaft assembly, which occur at this moment, are measured, and if the value for the moment of inertia $\theta$ of the shaft is selected in such a way that the kinetic power Pkin, calculated according to the formula $Pkin=4\pi^2\theta f(df/dt)$, is equal to the measured electric power PG at the moment of isolation.

The device according to the invention for carrying out the method according to the invention, said device comprising a power regulator for regulating the thermal power for the turbine, and first means which compare an output power of the turbo set with a predetermined power value and which transmit a differential value as a control signal to the power regulator, is defined in that second means for measuring the rotary frequency of the shaft are present, in that third means are present, which determine the kinetic power of the shaft assembly from the measured rotary frequency and the change in time df/dt of the rotary frequency in accordance with the equation $Pkin=4\pi^2\theta f(df/dt)$ ($\theta$=moment of inertia of the shaft assembly), and in that fourth means are present, which add the electric power delivered by the generator and the kinetic power determined by the third means and which transmit the same as the output power of the turbo set to the first means.

A preferred embodiment of the device according to the invention is defined in that the third means comprise a differentiating element, a multiplier and an amplifier with an adjustable gain.

According to the invention, the method is used for a turbo set which comprises a steam turbine or a gas turbine, or for a combined cycle power station which comprises a gas turbine and a steam turbine connected downstream of the gas turbine.

Further embodiments of the invention emerge from the dependent claims.

BRIEF DESCRIPTION OF THE DRAWINGS

A more complete appreciation of the invention and many of the attendant advantages thereof will be readily obtained as the same becomes better understood by reference to the following detailed description, when considered in connection with the accompanying drawings, wherein.

DESCRIPTION OF THE PREFERRED EMBODIMENT

Figure 1:
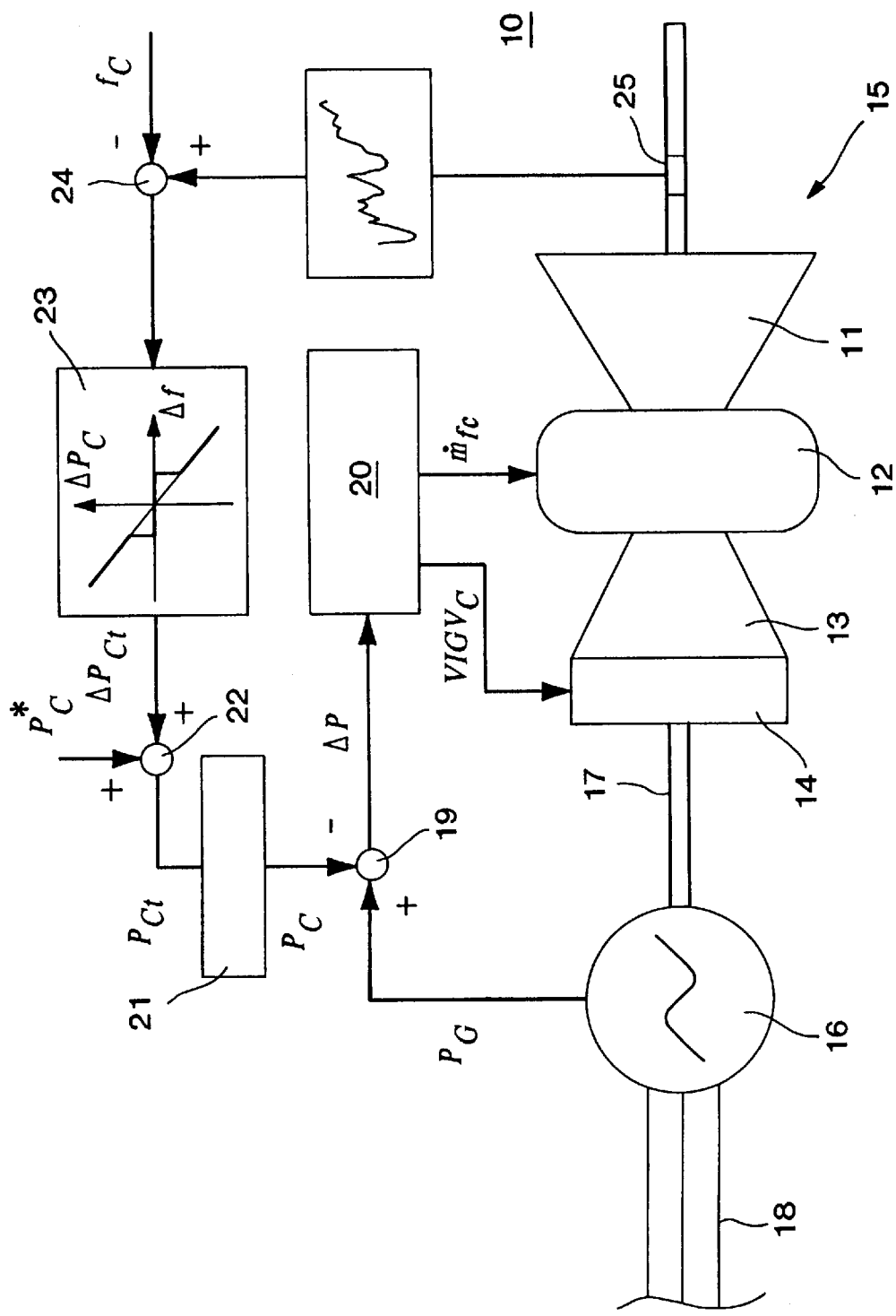
FIG. 1 shows a schematic circuit diagram of power regulation for a gas turbine according to the prior art.
Figure 2:
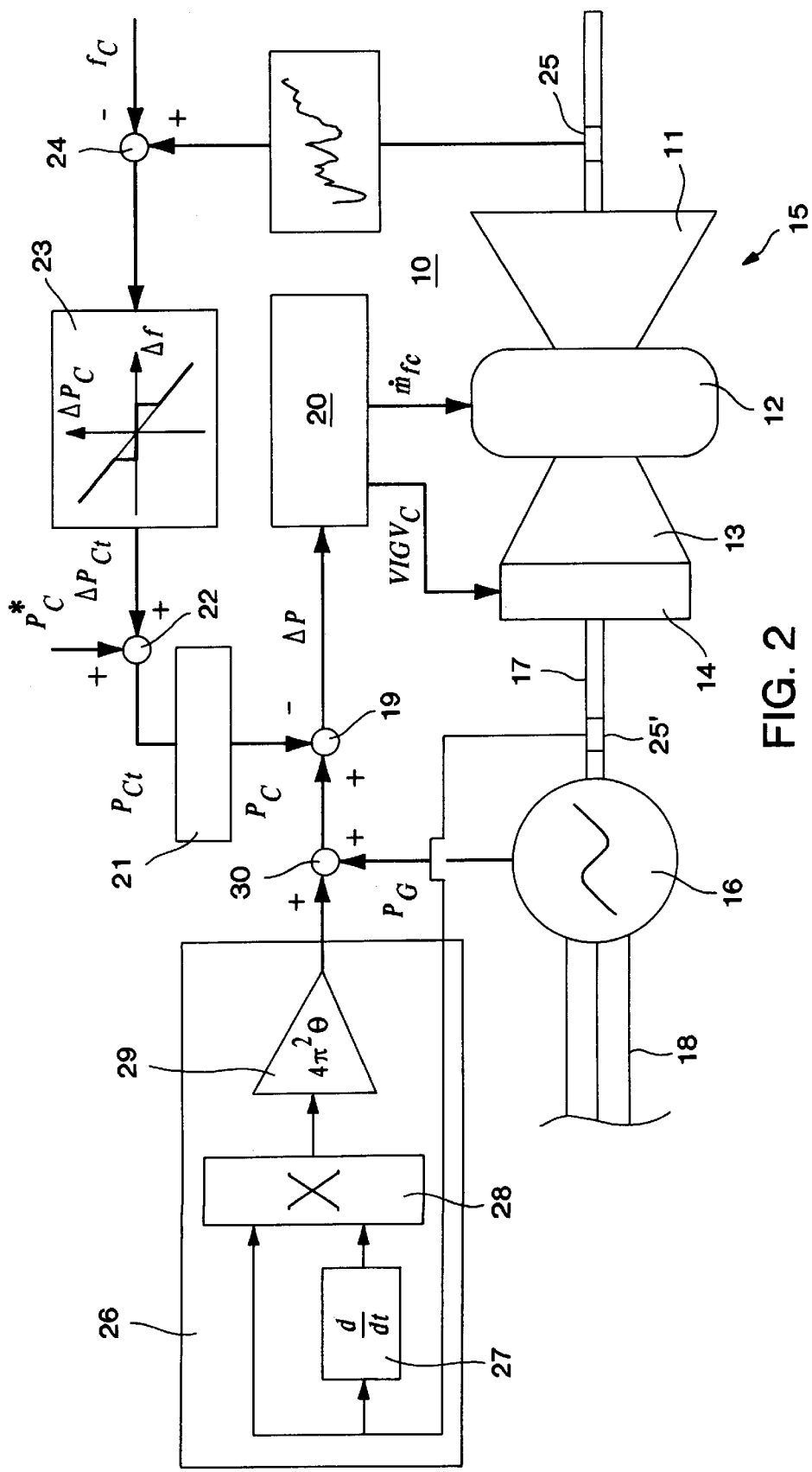
FIG. 2 shows the circuit diagram similar to that of FIG. 1, additionally taking into account the kinetic power of the shaft, according to a preferred exemplary embodiment of the invention.

Referring now to the drawings, wherein like reference numerals designate identical or corresponding parts throughout the several views, FIG. 2 illustrates, in a circuit diagram similar to that of FIG. 1, power regulation for a gas turbine 15, on which a preferred exemplary embodiment of the method according to the invention is based. The gas turbine 15, together with its parts 11, ..., 14, the shaft 17, the generator 16 switched to a network 18, and the control loop formed from the elements 19, ..., 25 are essentially the same as in FIG. 1 and are therefore also given the same reference symbols. There is a change, as compared with FIG. 1, to the effect that the measured electric power PG from the generator 16 is not compared directly at the subtractor 19 with the predetermined power desired value PC, but the kinetic power Pkin is first added to the electric power PG in an adder 30.

The kinetic power $P_{kin}$ is calculated, in a correction circuit 26, from the rotary frequency f of the shaft 17, measured at the shaft 17, in accordance with equation (2). For this purpose, the measured rotary frequency f is transmitted to one input of a multiplier 28 provided with two inputs. The change in time df/dt of the rotary frequency f is transmitted to the other input of the multiplier 28, said change being derived from the measured rotary frequency f by differentiation in a differentiating element 27. The product of the variables f and df/dt, which is calculated in the multiplier 28, is then amplified in an amplifier 29 which has the gain $4\pi2\theta$. The variable Pkin then appears at the output of the amplifier 29, which at the same time forms the output of the correction circuit 26, and is transmitted to the adder 30. The correction circuit 26 of the exemplary embodiment constitutes an analog computing circuit which calculates the desired kinetic power Pkin from the measured rotary frequency f. However, this calculation may, of course, also be carried out digitally by means of a microprocessor or the like if the input variables are previously digitized accordingly. In FIG. 2, for the sake of simplicity, the rotary frequency f is measured by means of a separate rotary frequency encoder 25'. Of course, this separate rotary frequency encoder 25' may be dispensed with and the output signal from the rotary frequency encoder 25 may be used for calculating the kinetic power.

As already mentioned, the sum of the electric power PG and kinetic power $P_{kin}$, said sum being formed in the adder 30, is compared, in the subtractor 19, with a predetermined power value PC, and the thermal power PT is reduced, when the difference ΔP is positive, or is increased, when the difference ΔP is negative. When a gas turbine 15, which comprises a controllable inlet 14 for the combustion air, a compressor 13 for compressing the combustion air, a combustion chamber 12 for the combustion of a fuel, with the combustion air being supplied, and a turbine 11, is regulated, the mass flow of admitted combustion air via the controllable inlet 14 and the mass flow of fuel $dm_{fc}/dt$ are regulated in order to regulate the thermal power $P_T$.

In the arrangement according to FIG. 2, the electric power PG for power regulation is picked up directly at the output terminals of the generator 16. If such measurement on the generator 16 is to be dispensed with, in order to determine the electric power PG delivered by the generator 16, the rotary frequency f of the shaft 17 and the torque exerted on the shaft 17 can be measured and the electric power $P_G$ is calculated from these variables. As a result, for example, insulation problems on the generator side may be avoided.

For calculating the kinetic power, it is necessary per se to know the moment of inertia θ of the shaft 17, so that, for example, the gain of the amplifier 29 can be set correspondingly. An experimental determination of θ is expedient in this respect. For this purpose, in a steady-state mode of the turbo set 10, the electric power PG is set to zero at one moment by isolating the generator 16 from the network 18. The rotary frequency f and angular acceleration df/dt of the shaft 17, which occur at this moment, are measured and are entered, for example, in the correction circuit 26. The value for the moment of inertia q of the shaft 17 and the gain of the amplifier 29 are selected, then, in such a way that the kinetic power Pkin, calculated according to the formula Pkin=$4\pi^2\theta f(df/dt)$, or the output signal from the amplifier 29, is equal to the measured electric power PG at the moment of isolation, moreover said electric power being equal to the thermal power PT at this moment (due to the stationary state prevailing at this moment).

The background to this type of determination is that, if the electric power PG lapses in a stationary state (kinetic power Pkin=0), the total thermal power is converted into kinetic power, thus leading to an acceleration of the shaft (df/dt>0). The kinetic power of the shaft 17, capable of being determined from the commencing acceleration, may therefore be equated directly with the thermal power at the moment of isolation or with the electric power, that is to say $PT=P_G=P_{kin}=4\pi^2\theta f(df/dt)$. Since PT and PG as well as f and df/dt are known, the moment of inertia θ can be ascertained from this.

The regulating method described can be used in the case of individual turbo sets or else in the case of a combination of a plurality of turbo sets. At the same time, as in the example explained, the turbine may be a gas turbine. However, it may also be a steam turbine. In particular, the method according to the invention can be used in combined cycle power stations which comprise at least one gas turbine and at least one steam turbine connected downstream of the gas turbine.

Obviously, numerous modifications and variations of the present invention are possible in the light of the above teachings. It is therefore to be understood that, within the scope of the appended claims, the invention may be practiced otherwise than as specifically described herein.

What is claimed as new and desired to be secured by Letters Patent of the United States is:

1. A method for regulating the power of a turbo set converting thermal power into electric power, said turbo set comprising, on a shaft, a first turbine driven by the thermal power and a generator driven by the first turbine and delivering electric power ($P_G$) to a network, in which method the electric power ($P_G$) delivered by the generator is determined and the thermal power ($P_T$) for the firs turbine is regulated as a function of the measured electric power ($P_G$), wherein, in addition, the kinetic power ($P_{kin}$) consumed or delivered by the shaft is determined, and wherein the thermal power ($P_T$) is regulated in accordance with the sum of the electric power ($P_G$) and kinetic power ($P_{kin}$).

2. The method as claimed in claim 1, wherein the sum of the electric power ($P_G$) and kinetic power ($P_{kin}$) is compared with a predetermined power value ($P_C$), and the thermal power ($P_T$) is reduced, when the difference (ΔP) is positive, and is increased, when the difference (ΔP) is negative.

3. The method as claimed in claim 1, wherein, in order to determine the kinetic power ($P_{kin}$), the rotary frequency (f) of the shaft is measured, and the kinetic power ($P_{kin}$) of the shaft and all rotating masses fixed to the shaft is calculated from the measured rotary frequency (f) in accordance with the formula $P_{kin}=4\pi^2\theta f(df/dt)$ (θ=moment of inertia of the shaft and all rotating masses fixed to the shaft.

4. The method as claimed in claim 1, wherein the first turbine is part of a gas turbine, the gas turbine comprising a controllable inlet for the combustion air, a compressor for compressing the combustion air, a combustion chamber for the combustion of a fuel, with the combustion air being supplied, and the first turbine, and wherein the mass flow of admitted combustion air via the controllable inlet and the mass flow of fuel ($dm_{fc}/dt$) are regulated in order to regulate the thermal power ($P_T$).

5. The method as claimed in claim 1, wherein, in order to determine the electric power ($P_G$) delivered by the generator, the rotary frequency (f) of the shaft and the torque exerted on the shaft are measured and the electric power ($P_G$) is calculated from these variables.

6. The method as claimed in claim 3, wherein, in order to fix the moment of inertia θ of the shaft and all rotating masses fixed to the shaft, which is critical for regulation, the electric power ($P_G$) is set to zero at one moment by isolating the generator from the network in a steady-state mode of the turbo set, and the rotary frequency (f) and the angular acceleration ft/dt of the shaft, which occur at this moment, are measured, and wherein the value for the moment of inertia θ of the shaft and all rotating masses fixed to the shaft is selected in such a way that the kinetic power ($P_{kin}$), calculated according to the formula $P_{kin}=4\pi^2\theta f(df/dt)$, is equal to the measured electric power ($P_G$) at the moment of isolation.

7. The method as claimed in claim 1 wherein the turbo set comprises a steam turbine.

8. The method as claimed in claim 1 wherein the turbo set comprises a gas turbine.

9. The use of the method as claimed in claim 1 for a combined cycle power station which comprises a gas turbine and a steam turbine connected downstream of the gas turbine.

* * * * *